UNITED STATES PATENT OFFICE.

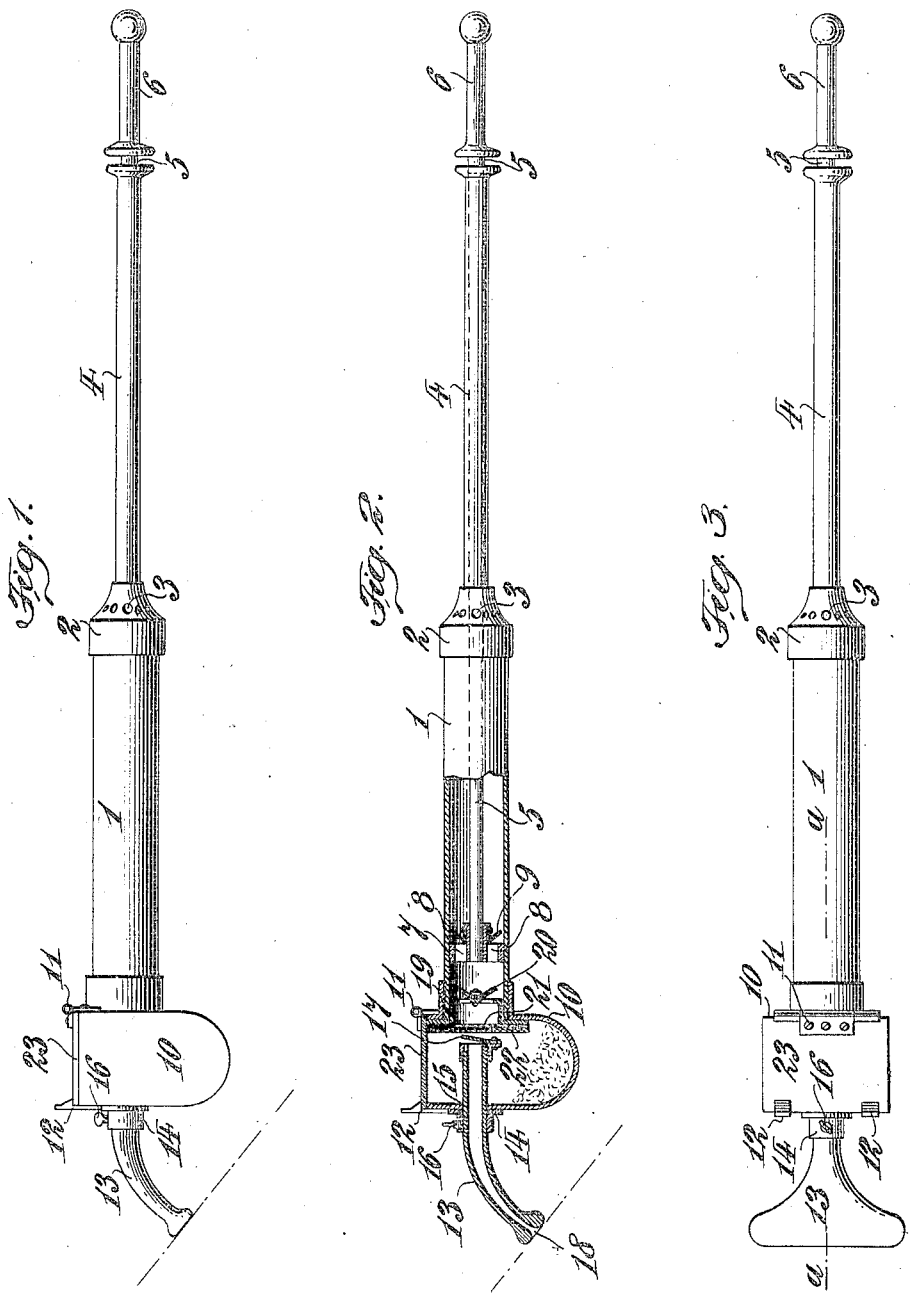

CHARLES G. HUTCHINSON, OF NEW YORK, N. Y.

HAND VACUUM-CLEANER.

971,044.

Specification of Letters Patent. Patented Sept. 27, 1910.

Application filed February 16, 1909. Serial No. 478,178.

*To all whom it may concern:*

Be it known that I, CHARLES G. HUTCHINSON, a citizen of the United States, residing at New York, in the county of New York and State of New York, have invented certain new and useful Improvements in Hand Vacuum-Cleaners, of which the following is a specification, reference being had therein to the accompanying drawing.

My invention relates especially to that class of devices employed for removing dust and dirt from carpets, rugs, upholstery, curtains, walls, etc., and has for its object the provision of a simple, cheap and effective hand vacuum cleaner which may be operated by one person.

To attain the desired end, my invention consists in certain novel and useful combinations or arrangements of parts, and peculiarities of construction and operation, all of which will be hereinafter first fully described, and then pointed out in the claim.

In the drawing, Figure 1 is a side elevation of a device embodying my invention. Fig. 2 is a longitudinal, sectional view at line *a—a* of Fig. 3, and Fig. 3 is a plan view of the device.

Similar numerals of reference, wherever they occur, indicate corresponding parts in all the figures.

1 is a cylinder, made of any approved material.

2 is a cap fitting upon one end of the tube 1, said cap having perforations 3 therein and being provided with a tubular hand-piece 4.

5 is a rod provided with a manipulating piece 6, this rod extending through the tubular hand-piece 4 and into the cylinder 1, bears a piston 7 on its inner extremity. The piston is provided with perforations 8, and a valve 9, made of leather, or other suitable material.

10 is a dust receptacle removably secured to the cylinder 1, and having a cover 23 hinged at 11.

12 are catches for holding the cover tightly closed, or for releasing it so it may turn back upon its hinge.

13 is a spout or mouth piece extending into the dust receptacle through a collar 14 and a perforation 15 in the front wall of the receptacle 10.

16 is a set screw for holding and adjusting the spout 13.

17 is a valve removably held upon the inner end of the spout 13.

I have shown the spout 13 as provided with a wide mouth or opening 18, but it is obvious the shape of such mouth may be varied in accordance with the work to be done, as the spouts are made interchangeable, without departing from the spirit of my invention.

19 is a flanged collar removably located in the cylinder 1 at its union with the dust receptacle 10. This collar has a valve 20 at one side, and bears at the other, within the dust receptacle, a straining device consisting of wire gauze 21, and coarse cloth 22, or the equivalent.

The spout 13 extends into the receptacle 10, out of contact with the walls thereof excepting where it enters. The result of this arrangement, shown particularly in Fig. 2 of the drawing, is to throw the dust against the walls of the receptacle, as it enters, and deflect it to the bottom of the receptacle.

I have discovered that in order to make a device of this nature practical and easily operated in general use, it is of the greatest importance and very essential that means be provided to facilitate the removal of dust directly from the device without disconnecting any of the parts. Therefore I have provided means in the dust receptacle whereby its contents may be easily, quickly and conveniently removed directly therefrom, and without soiling the hands of the operator. In actual practice I find that in order to prevent any return, or possible escape of dust through the spout, after entering the same, it is of great advantage and I have provided a valve 17 at the end of the spout, thereby preventing dust from returning or being ejected therefrom by any reaction of the means for suction of air.

In operation, the user holds the hand-piece 6 and moves the piece 4, carrying the cylinder and connected parts, with the other hand, passing the spout over the surface to be cleaned, as the piston is reciprocated; or the cylinder and connected parts may be held stationary and the piston reciprocated, in accordance with the requirements of the work being done. When it is desired to remove the dust, the cover of the receptacle is thrown back and the receptacle reversed in position, and the air filter may be readily removed for cleaning or replacing.

Having now fully described my invention, what I claim as new therein and desire to secure by Letters Patent, is:

A dust collecting implement adapted to be reciprocated over a surface to be cleaned, comprising the combination of a rigid suction spout adapted to be moved over a surface to be cleaned, a suction pump, a dust receptacle extending diametrically beyond the end of the pump cylinder and located between said spout and pump cylinder, said dust receptacle being provided with an air filter and means for removal of dust and the air filter without disconnecting the pump from the dust receptacle.

In testimony whereof I hereto affix my signature in presence of two witnesses.

CHARLES G. HUTCHINSON.

Witnesses:
    LOUIS F. BRAUN,
    A. M. PIERCE.